(No Model.)
C. HECOX.
CLAMPING COLLAR FOR ATTACHING HOSE.
No. 386,882.  Patented July 31, 1888.
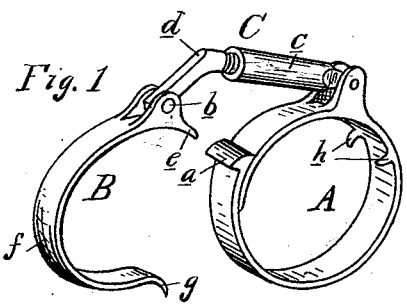
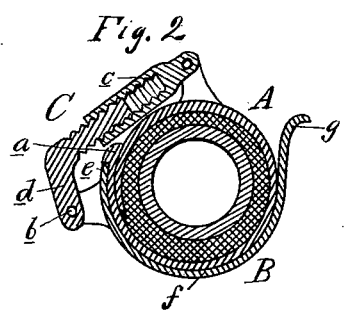
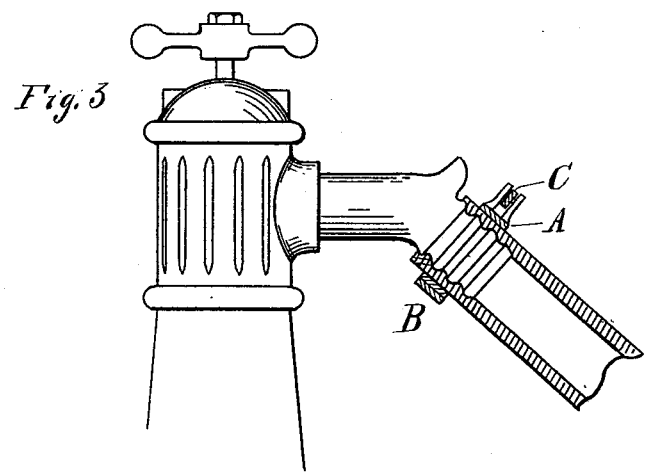
Witnesses:
P. M. Hulbert.
John Sehmman.
Inventor:
Charles Hecox.
By Thos. S. Sprague & Son.
Att'y.

United States Patent Office.

CHARLES HECOX, OF MIDLAND, MICHIGAN, ASSIGNOR OF TWO-THIRDS TO HENRY BARTLETT AND JAMES H. WHITMORE, OF SAME PLACE.

CLAMPING-COLLAR FOR ATTACHING HOSE.

SPECIFICATION forming part of Letters Patent No. 386,882, dated July 31, 1888.

Application filed March 20, 1888. Serial No. 267,856. (No model.)

*To all whom it may concern:*

Be it known that I, CHARLES HECOX, a citizen of the United States, residing at Midland, in the county of Midland and State of Michigan, have invented certain new and useful Improvements in Clamping-Collars for Attaching Hose, of which the following is a specification, reference being had therein to the accompanying drawings.

This invention relates to new and useful improvements in hose-clamps for attaching hose to nozzles, couplings, hydrants, &c., whereby the same may be detachably secured at a minimum of time.

My invention consists in the peculiar construction and operation of a split collar provided with a clamping lever, all as more fully hereinafter described.

In the drawings which accompany this specification, Figure 1 is a perspective view showing my improved device in its unclamped condition. Fig. 2 is a cross section through the coupling perfected. Fig. 3 is a section through the nozzle of a hydrant or street-washer, illustrating its general use to which it is intended principally to be applied.

A is a split collar, preferably of spring metal and formed with overlapping ends, the outer end of which is provided with the abutment $a$.

B is a curved lever of the general curvature of the collar, and pivotally secured at $b$ to a connecting-link, C, the opposite end of which is pivotally secured in any suitable manner at or near the inner end of the split collar. Connecting-link C is preferably made of two parts, $c\ d$, as shown, screw-threaded together to permit lengthening or shortening. The lever B is fulcrumed to the end of such connecting-link in such manner as to form the short arm $e$ and the longer arm, $f$, which terminates in the thumb-piece $g$.

In practice, the device being constructed and arranged as described and shown, it is intended to operate as follows: The split collar, being of a diameter to loosely fit the hose, is slipped over the end thereof, and the end of the hose engaged upon a suitable nozzle, thimble, or coupling of a hydrant. The short arm $e$ of the lever is then engaged upon the abutment $a$ and the long arm $f$ depressed until it embraces the collar, by its peculiar shape firmly locking thereon. Should the necessary clamping action not be obtained, the connecting-link may be correspondingly shortened to effect it in the desired manner. The necessary length of the arm $f$ to effect the self-locking is about one-half more or less of the circumference of the split collar.

If desired, spur $h$ may be provided for upon the inner face of the collar to engage or prick into the hose and form a tighter grip thereon, or the whole inner face of the split collar may be corrugated in the ordinary manner of constructing hose clamps of known construction.

What I claim as my invention is—

1. In a hose clamp, the combination, with the split spring-collar provided with overlapping ends and adapted to loosely fit the hose, of the abutment formed at one end thereof, and the connecting-links pivotally connected to the other end, the curved lever embracing the collar and fulcrumed to that link, and having the curved locking arm and thumb-piece, substantially as described.

2. In a hose-clamp, the combination, with the split spring-collar provided with the overlapping ends and adapted to loosely fit the hose, of an abutment formed at one end thereof, the adjustable connecting-link pivotally connected to the other end, and the curved lever fulcrumed to that link, and having the curved locking-arm and thumb piece, substantially as described.

3. In a hose-clamp, the combination, with the split spring-collar of a single piece, formed with the abutment, of the link C, pivotally secured at one end to said collar and formed of two parts, $c\ d$, screw threaded and adjustably connected together, and the curved lever pivotally secured to one part of said link and formed with short arm $e$, long arm $f$, and thumb-piece $g$, and the spur $h$ on the inner face of the collar, substantially as and for the purpose specified.

In testimony whereof I affix my signature, in presence of two witnesses, this 29th day of February, 1888.

CHARLES HECOX.

Witnesses:
P. M. HALBERT,
JAS. WHITTEMORE.